United States Patent
Watanabe et al.

(10) Patent No.: US 6,868,549 B2
(45) Date of Patent: Mar. 15, 2005

(54) DISK CLAMP APPARATUS

(75) Inventors: Takashi Watanabe, Ichikawa (JP); Satoru Inoue, Iruma (JP)

(73) Assignee: Teac Corporation, Tokyo (JP)

( * ) Notice: Subject to any disclaimer, the term of this patent is extended or adjusted under 35 U.S.C. 154(b) by 217 days.

(21) Appl. No.: 10/043,503

(22) Filed: Jan. 10, 2002

(65) Prior Publication Data
US 2002/0089918 A1 Jul. 11, 2002

(30) Foreign Application Priority Data

Jan. 10, 2001 (JP) ........................................ 2001-003071
Jan. 10, 2001 (JP) ........................................ 2001-003072

(51) Int. Cl.[7] ........................ G11B 17/028; G11B 17/03; G11B 19/20; G11B 23/00; G11B 25/00
(52) U.S. Cl. ...................... 720/715; 720/707; 369/271.1
(58) Field of Search ................................ 369/271, 270, 369/264, 258, 176, 270.1, 271.1; 360/99.05, 99.12; 720/658, 695, 703, 704, 706, 712, 715, 707

(56) References Cited

U.S. PATENT DOCUMENTS

| | | | | |
|---|---|---|---|---|
| 5,761,186 A | * | 6/1998 | Mushika et al. | 369/271.1 |
| 5,774,445 A | * | 6/1998 | Sawi et al. | 369/270.1 |
| 6,208,613 B1 | * | 3/2001 | Iizuka | 269/271.1 |
| 6,226,254 B1 | * | 5/2001 | Komatsu et al. | 369/270.1 |
| 6,507,556 B2 | * | 1/2003 | Yamanaka | 369/270.1 |
| 6,525,441 B2 | * | 2/2003 | Yamaguchi | 310/90 |
| 2003/0026193 A1 | * | 2/2003 | Shiomi et al. | 369/270.1 |

FOREIGN PATENT DOCUMENTS

| | | |
|---|---|---|
| JP | 9-69272 | 3/1997 |
| JP | 10-302359 A | * 11/1998 |

* cited by examiner

Primary Examiner—Julie Anne Watko
(74) Attorney, Agent, or Firm—Anderson Kill + Olick, P.C.; Eugene Lieberstein; Michael N. Meller

(57) ABSTRACT

A disk clamp apparatus, includes a disk mount surface part on which a record medium having a disk shape is mounted, the disk mount surface part including a part which faces an innermost circumference surface of the record medium, and a part which faces an outer circumference surface situated further out than the innermost circumference surface, wherein the part which faces the innermost circumference surface of the record medium has a same height as a height of the part which faces the outer circumference surface situated further out than the innermost circumference surface.

10 Claims, 13 Drawing Sheets

DISK CLAMP APPARATUS

BACKGROUND OF THE INVENTION

1. Field of the Invention

The present invention generally relates to disk clamp apparatuses, and more particularly, to a disk clamp apparatus to clamp an inner circumference of a record medium having a disk shape which is mounted on a disk mount surface thereof.

2. Description of the Related Art

Figure 1A:
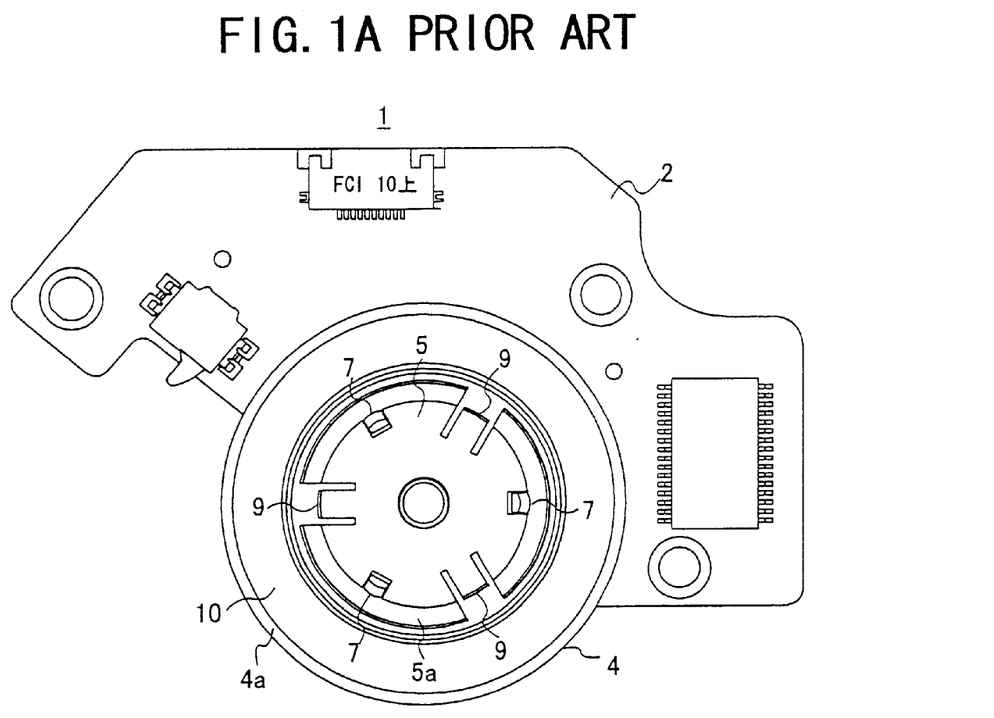
FIG. 1A is a plan view of a conventional disk clamp apparatus.
Figure 1B:
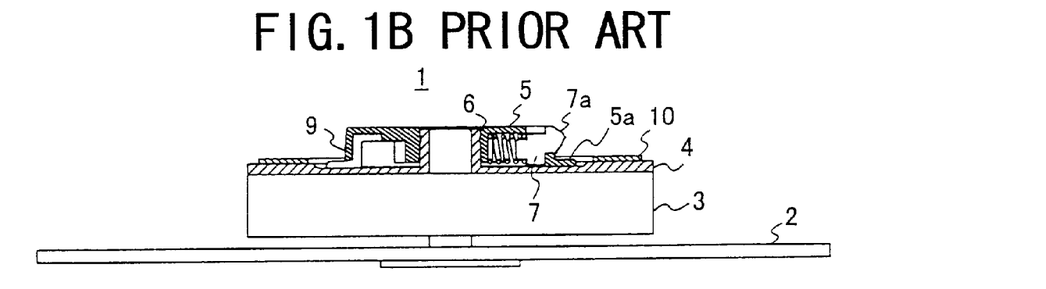
FIG. 1B is a side sectional view thereof.
Figure 2:
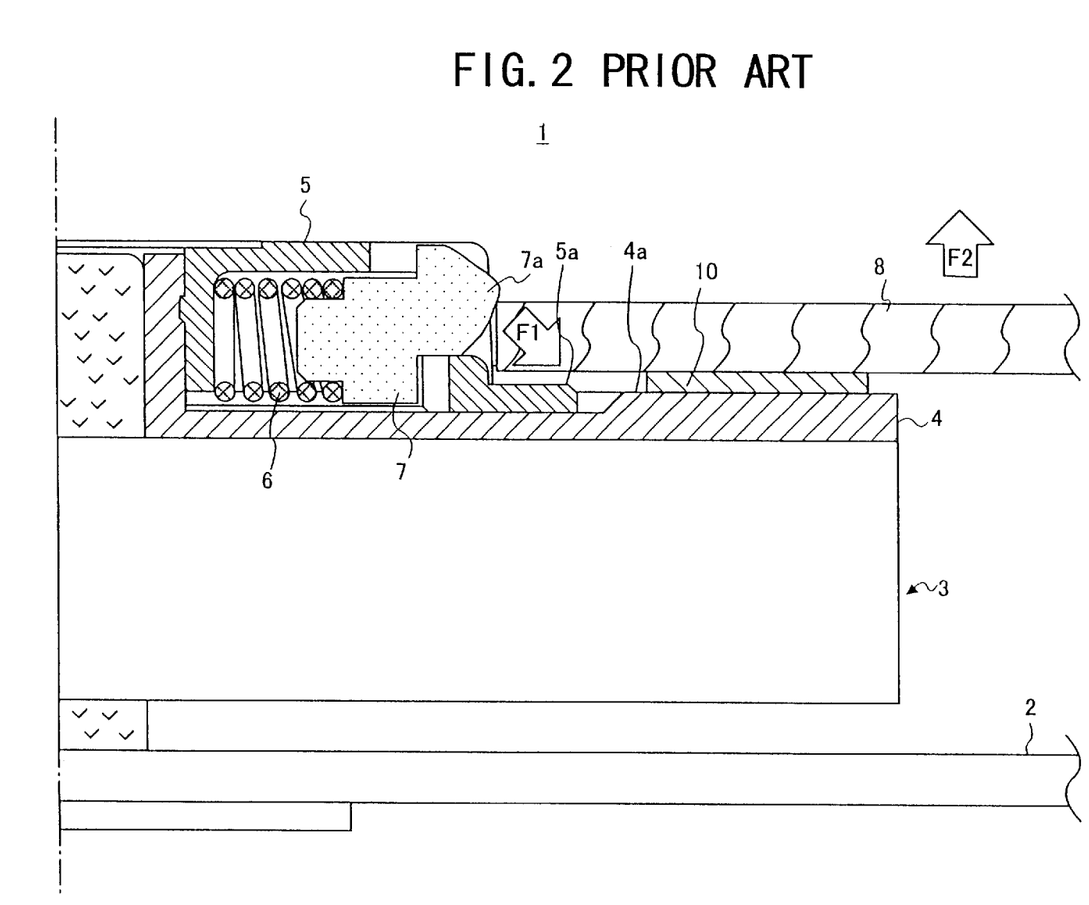
FIG. 2 is a greatly enlarged detailed vertical sectional view of a disk clamp part of the conventional disk clamp apparatus.

FIG. 1A is a plan view of a conventional disk clamp apparatus and FIG. 1B is a side sectional view thereof. FIG. 2 is a greatly enlarged detailed vertical sectional view of a disk clamp part of the conventional disk clamp apparatus.

Referring to FIGS. 1A, 1B and 2, the conventional disk clamp apparatus 1 includes a clamper table 4, a clamper top 5, and a clamp member 7, and a core adjusting member 9. The clamper table 4 is rotationally driven by a disk driving motor 3 mounted on a print board 2. The clamper top 5 projects on a center of the clamper table 4. The clamp member 7 is pushed in a radial direction by a spring force of a coil spring 6 provided inside of the clamper top 5. The core adjusting member 9 which is at an outer circumference of the clamper top 5 is clamped at an inner circumference of a record medium having a disk shape (hereinafter "disk") 8, so that the core of the disk 8 is adjusted to the core of the clamper top 5.

The clamper table 4 is fixed on an upper surface of the disk driving motor 3. An upper surface of the clamper table 4 has a disk mount surface 4a. A friction member 10, having a donut shape and made of a rubber material, is fixed on the disk mount surface 4a.

Three of the clamp members 7 and three of the core adjusting members 9 are arranged at the clamper top 5 reciprocally. The disk 8 is clamped by the clamp members 7, and thereby the core of the disk 8 is adjusted to the core of the clamper top 5 by the core adjusting members 9.

However, according to the above-described conventional disk clamp apparatus, the core of the disk 8 is adjusted to the core of the clamper top 5 by the respective core adjusting members 9 having intervals of 120 degrees at the clamper top 5 and the disk 8 is clamped by the respective clamp members 7 having intervals of 120 degrees at the clamper top 5. Therefore, since the intervals between of the respective clamp members 7 are relatively wide, a clamp force for clamping a center hole of the disk is generated unevenly. Therefore, it is difficult to keep a surface accuracy of an edge part of a circumference of the center hole of the disk 8.

Hence, when the clamp force having intervals of 120 degrees is applied to the edge part of the circumference of the center hole of the disk, an inner circumference side of a disk record surface is partially deformed. As a result, a problem to reduced record accuracy occurs.

Furthermore, according to the above described conventional disk clamp apparatus, the friction member 10 has an inner diameter (for instance 22 mm) which is larger than an inner diameter of the disk 8 (for instance 15 mm). In addition, a guard part 5a formed together with the clamper top 5 projects on the disk mount surface 4a of the clamper table 4. The guard part 5a faces an innermost circumference part of the disk 8. The guard part 5a has a height lower than a height of the friction member 10.

When the clamp member 7 comes in contact with the inner circumference of the disk 8 caused by a spring force of the coil spring 6, a head end part 7a of the clamp member 7 is pushed against the inner circumference of the disk 8 obliquely-downward with a force F1. Because the inner circumference of the disk 8 is not in contact with the guard part 5a of the clamper top 5, an inner circumference side of the disk 8 is deformed downwardly and an outer circumference side of the disk 8 is pushed upwardly by a force F2, and thereby the record surface of the disk 8 is warped like a cone shape.

According to an actual measurement of a deformation of the disk 8, a position on an outer circumference side of the disk 8 (a position with a radius of 58 mm) is deformed upwardly by 70 μm compared to a position on the inner circumference side of the disk 8 (a position with a radius of 24 mm). Thus, if the record surface of the disk 8 is warped by even a small amount, an error may occur when recording is implemented by irradialting with a laser with an optical pick up.

Particularly, when the disk 8 is clamped in a recording device such as a CD-Re Writable (CD-RW) device to record information, it is necessary to have compatibility with other companies' devices and high accuracy in recording the information. Therefore, if the disk is clamped by the conventional disk clamp apparatus in a state where the inner circumference side of the disk is deformed downward and the outer circumference side of the disk is deformed upward, a problem may occur in that the accuracy of the recorded informetion is reduced.

SUMMARY OF THE INVENTION

Accordingly, it is a general object of the present invention to provide a novel and useful disk clamp apparatus where one or more of the problems described above are eliminated.

Another and more specific object of the present invention is to provide a disk clamp apparatus, including a disk mount surface part on which a record medium having a disk shape is mounted, the disk mount surface part including a part which faces an innermost circumference surface of the record medium, and a part which faces an outer circumference surface situated further out than the innermost circumference surface, wherein the part which faces the innermost circumference surface of the record medium has a same height as a height of the part which faces the outer circumference surface situated further out than the innermost circumference surface.

The disk clamp apparatus may further include a friction member fixed on the disk mount surface, wherein the friction member forms a continuous surface part in a designated area from the innermost circumference surface to the outer circumference surface situated further out than the innermost circumference surface of the record medium.

The disk clamp apparatus may further include a clamp part provided at a center of the disk mount surface for clamping an inner circumference of the record medium, and wherein the clamp part has a projection part projecting from the clamp part to the part which faces the innermost circumference surface of the record medium, and the projection part has a same height as a height of the part which faces the outer circumference surface situated further out than the innermost circumference surface of the record medium.

The part which faces the innermost circumference surface of the record medium may be united with the part which faces the outer circumference surface situated further out than the innermost circumference surface of the record medium.

According to the above invention, it is possible to provide a disk clamp apparatus whereby the disk is clamped without being warped, and thereby it is possible to improve a record accuracy.

Another and more specific object of the present invention is to provide a disk clamp apparatus, including a disk mount surface part on which a record medium having a disk shape is mounted, and a clamp part provided at a center of the disk mount surface, wherein the clamp part comprises a plurality of clamp members by which a center hole of the record medium is clamed, and the each clamp member has an interval less than 90 degrees.

Five or more of the clamp members may be provided at the clamp part. The clamp part may include a plurality of core adjusting members with which an inner circumference of a center hole of the record medium comes in contact, and five or more of the clamp members and five or more of the core adjusting members are provided at the clamp part.

According to the above invention, it is possible to keep a surface accuracy of an edge part of a circumference of a center hole of the disk by narrowing an interval between a plurality of clamp forces applied to the edge part of the circumference of the center hole of the disk.

Another and more specific object of the present invention is to provide a disk clamp apparatus, including a disk mount surface part on which a record medium having a disk shape is mounted, and a clamp part provided at a center of the disk mount surface, wherein the clamp part comprises a plurality of clamp members having intervals less than 90 degrees respectively by which a center hole of the record medium is clamed and a plurality of core adjusting members with which an inner circumference of the center hole of the record medium comes in contact, and the clamp members, a center of rotation of the record medium, and the core adjusting members are arranged in line.

According to the present invention, it is possible to achieve a balance between a clamp force by a clamp member and a pressing force by a core adjusting member. As a result of this, it is possible to adjust a core of the disk to a center for rotating of the disk and clamp the disk stably and smoothly.

Other objects, features, and advantages of the present invention will be more apparent from the following detailed description when read in conjunction with the accompanying drawings.

DETAILED DESCRIPTION OF THE PREFERED EMBODIMENTS

A description will now be given, with reference to the FIGS. 3 to 13, of embodiments of the present invention.

Figure 3:
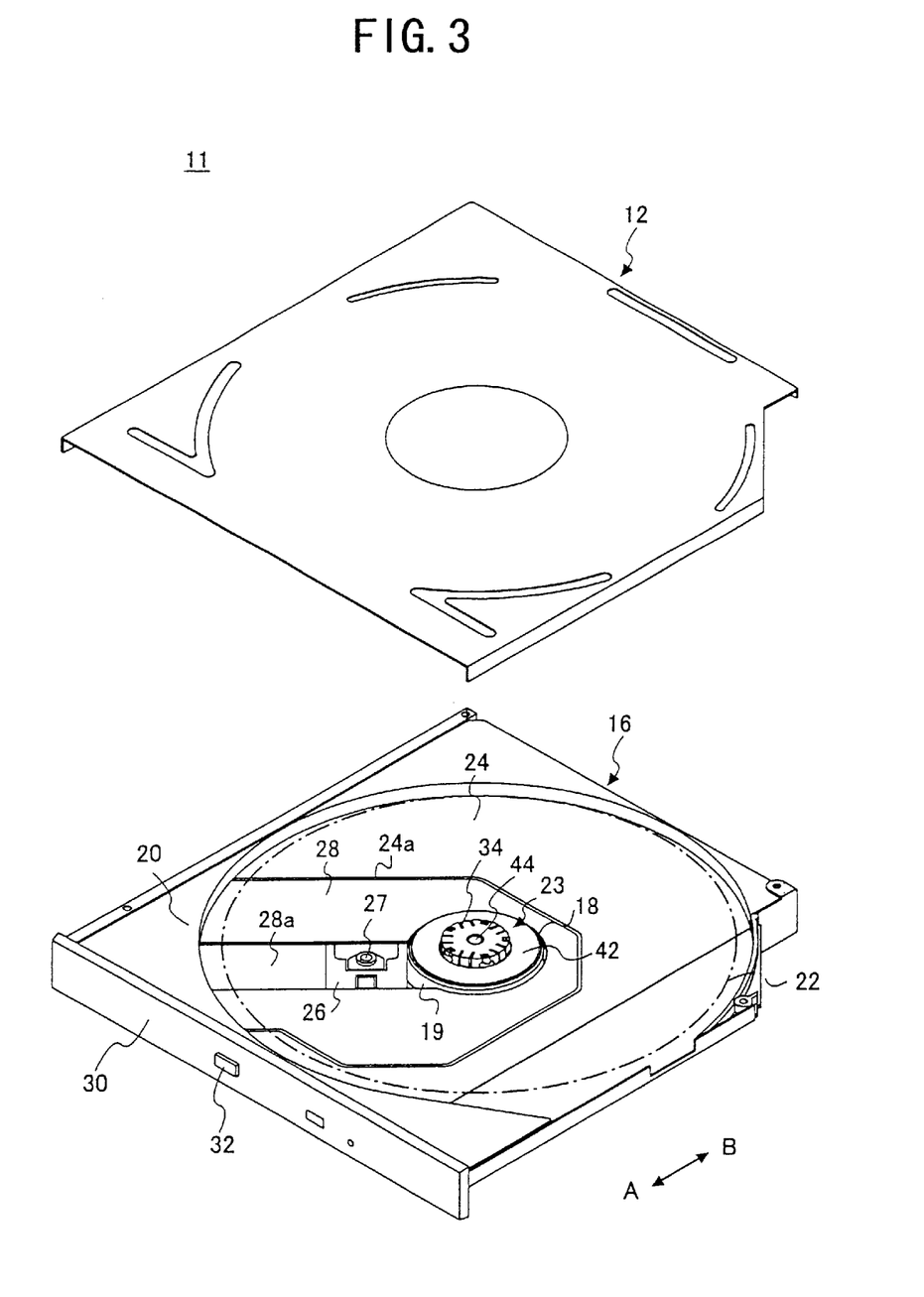
FIG. 3 is an exploded and perspective view showing a disk device to which a first embodiment of a disk clamp apparatus according to the present invention is applied.

FIG. 3 is an exploded perspective view showing a disk device to which a first embodiment of a disk clamp apparatus according to the present invention is applied.

Referring to FIG. 3, a disk device 11, for instance a CD-ROM drive device, includes a tray 20 supporting a clamp table 18 in a state where the clamp table 18 can be rotated in a space formed between an upper cover 12 and a lower cover 16. A disk clamp apparatus 23 is provided at a center of a clamp table 18. A disk 22 shown as a one doted line in FIG. 3 has an inner circumference clamped by the disk clamp apparatus 23. A disk storage part 24 having a diameter greater than a diameter of the disk 22 is formed around the clamp table 18.

An optical pick up 26 is provided below the disk storage part 24 as the optical pick up 26 can move in a disk radial direction. Information which is recorded in the disk 22 clamped by the disk clamp apparatus 23 of the clamp table 18 is read out by the optical pick up 26. The optical pick up 26 is stored at a concave part 24a of the disk storage part 24. The concave part 24a is covered with a pick up cover 28 having a opening part 28a in a movable range of an objective lens 27 of the optical pick up 26. A front side bezel 30 connected to a front side of the tray 20 is equipped with an eject button 32 in the center of the front side bezel 30.

The clamp table 18 and the disk 22 clamped by the disk clamp apparatus 23 of the clamp table 18 rotate as a disk driving motor 19 provided below the clamp table 18 rotates.

As shown in FIG. 3, the tray 20 is supported as both sides of the tray 20 can slide in front and rear directions (A and B directions). If an eject button 32 on the front slide bezel 30 is operated by pushing, a lock of the tray 20 is unlocked. The tray 20 whose lock is unlocked can slide in the A direction and be pulled out to the position where the disk can be exchanged by manual operation. After the disk 22 is clamped at the clamp table 18 of the tray 20 which is pulled out to the position where the disk can be exchanged, the tray 20 is moved in the B direction and locked at the position where the disk can be exchanged as shown in FIG. 3, by pushing the front bezel 30 in the B direction.

Figure 4A:
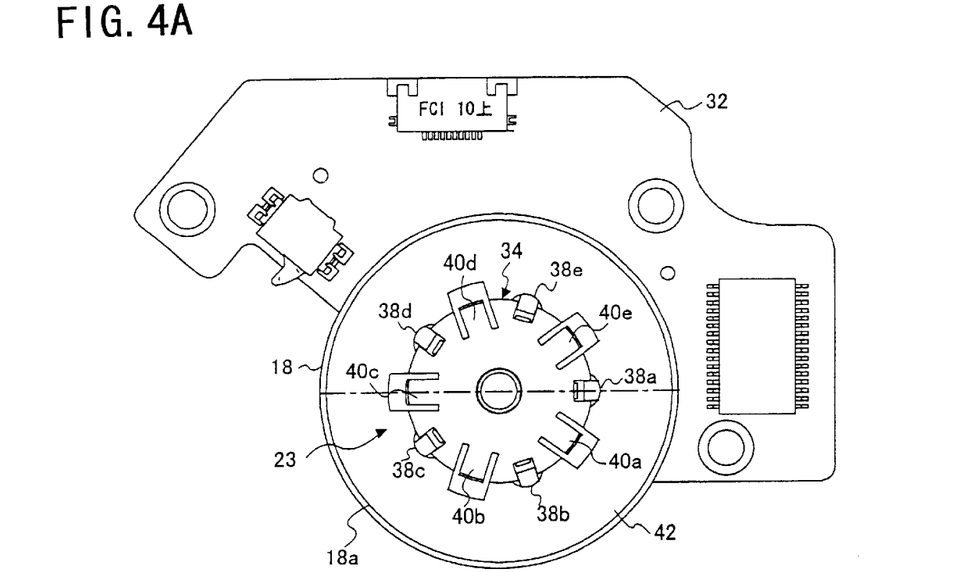
FIG. 4A is a plan view of a disk clamp apparatus of the present invention.
Figure 4B:
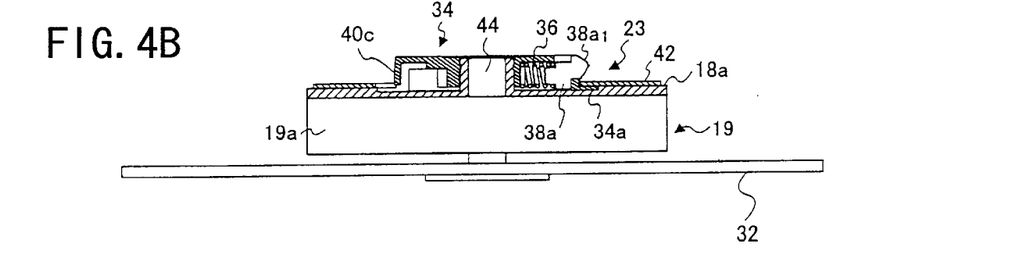
FIG. 4B is a side sectional view of the disk clamp apparatus of the present invention.
Figure 5:
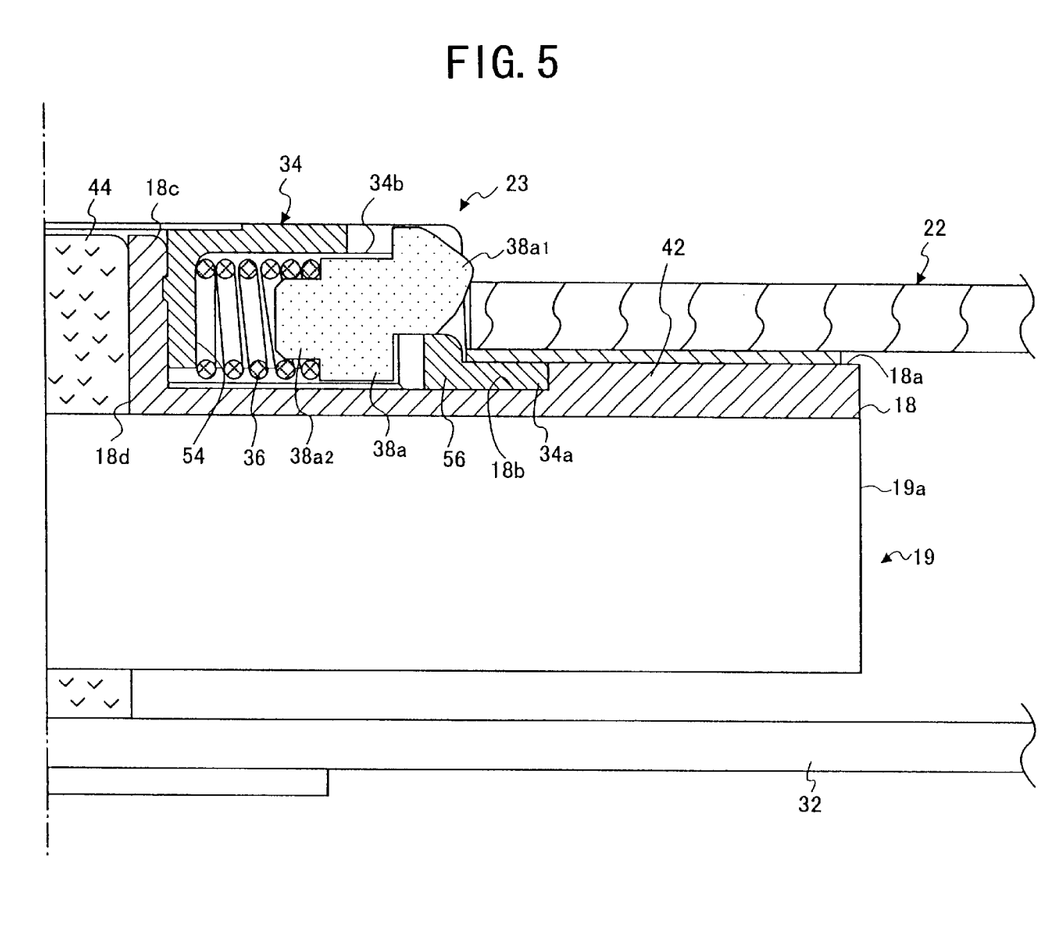
FIG. 5 is a greatly enlarged detailed vertical sectional view of a disk clamp part of the disk clamp apparatus of the present invention.

FIG. 4A is a plan view of a disk clamp apparatus of the present invention. FIG. 4B is a side sectional view of the disk clamp apparatus of the present invention. FIG. 5 is a greatly enlarged detailed vertical sectional view of a disk clamp part of the disk clamp apparatus of the present invention;

Referring to FIGS. 4A, 4B and 5, the disk clamp apparatus 23 includes a clamper table 18, a clamper top 34, five of clamper members 38a through 38e, and five of core adjusting members 40a through 40e. The clamper table 18 is rotationally driven by a disk driving motor 19 mounted on a print board 32. The clamper top 34 projects at a center of the clamper table 18. The clamp members 38a through 38e are pushed in an outward radial direction by a spring force of a spring coil 36 provided inside of the clamper top 34. The core adjusting members 40a through 40e at an outer circumference of the clamper top 34 are clamped to the inner circumference of the disk 22.

The clamper table 18 is fixed on an upper surface of a rotor case 19a of the disk driving motor 19. An upper surface of the clamper table 18 has a disk mount surface 18a. A friction member 42, having a donut shape and made of a rubber material, is fixed on the disk mount surface 18a in order to prevent the disk 22 from slipping off to the side. Since the clamper table 18 has a center hole where a rotating shaft 44 of the disk driving motor 19 is fixed, the clamper table 18 rotates together with the rotor case 19a and the clamper top 34.

The clamp members 38a through 38e and the core adjusting members 40a through 40e are arranged at an outer circumference of the clamper top 34 with intervals of 72 degrees and with each core adjusting member arranged reciprocally to a clamp member. The core adjusting members 40a through 40e are arranged to directions of 180 degrees against positions where the clamp members 38a through 38e are arranged. That is, the clamp members 38a to 38e, a center of rotation of the disk 22, and core adjusting members 40a through 40e are arranged in line respectively. Because of this, when the clamp forces of the clamp members 38a through 38e are applied to edge parts of the circumference of the center hole of the disk 22, clamp forces are applied to the core adjusting members 40a through 40e which are arranged to directions of 180 degrees against positions of the clamp members 38a through 38e, due to the principle of reaction. Therefore, it is possible to adjust the core of the disk 22 to the core of the clamper top 34 and clamp the disk 22 stably and smoothly. Furthermore, it is possible to keep a surface accuracy of the edge part of the circumference of the center hole of the disk 22 by narrowing an angular interval between the clamp forces applied to the edge part of the circumference of the center hole.

In addition, according to the disk clamp apparatus 23 of the present invention having five of the clamp members 38a through 38e, if the total clamp force of all of the disk clamps is made equal to the clamp force of a conventional disk clamp apparatus having three of the clamp members, the clamp force from one clamp member can be reduced to three-fifths of the clamp force from one clamp member in the conventional disk clamp apparatus. Therefore, it is possible to keep a surface accuracy of the disk by preventing the disk from being warped.

In the clamper top 34, the clamper members 38a through 38e are arranged with the core adjusting members 40a through 40e reciprocally. The disk 22 is clamped by the clamp members 38a through 38e at a position where the core adjusting members 40a through 40e adjust the core of the disk to the core of the clamper top. Thus, the core adjusting members 40a through 40e adjust the core of the disk to the core of the clamper top at five positions. Therefore, a clamp accuracy is heightened by the clamp members 38a through 38e as well as the core-adjusting accuracy being heightened. Because of this, the disk 22 can be rotated by the disk driving motor 19 with a high speed under a stable state. Hence, a record or playback accuracy is heightened when a laser irradiates though the objective lens 27 of the optical pick up 26 and the information is recorded or played back.

The friction member 42 fixed on the disk mount surface 18a has an inner diameter having substantially the same size as the inner diameter of the disk 22 and an outer diameter which is slightly less than the outer diameter of the disk mount surface 18a. In addition, a guard part 34a projecting from the outer circumference of the clamper top 34 in a radial direction is extended below the innermost circumference part of the friction member 42. An upper surface of the guard part 34a is provided at a position where same surface as the disk mount surface 18a is formed. Hence, the friction member 42 is mounted on a surface having no convex or concave parts from a position facing an innermost circumference part of the disk 22 to an outer circumference of the disk mount surface 18a.

Thus, since the friction member 42 is extended to a position where the friction member 42 faces the innermost circumference part of the disk 22, the respective pushing forces by the friction members 38a through 38e clamping to the edge of the inner circumference of the disk 22 can be accommodated by the friction member 42. Therefore, it is possible to prevent the edge of the inner circumference of the disk 22 from being deformed downward even when head end parts $38a_1$ through $38e_1$ of the clamp members 38a through 38e push obliquely-downward on the edge of the inner circumference of the disk 22 due to a spring force of the coil springs 36. Therefore, it is possible to keep a surface accuracy of the disk 22 in a clamped state.

Next, respective members for forming a disk clamp apparatus 23 will be described.

Figure 6:
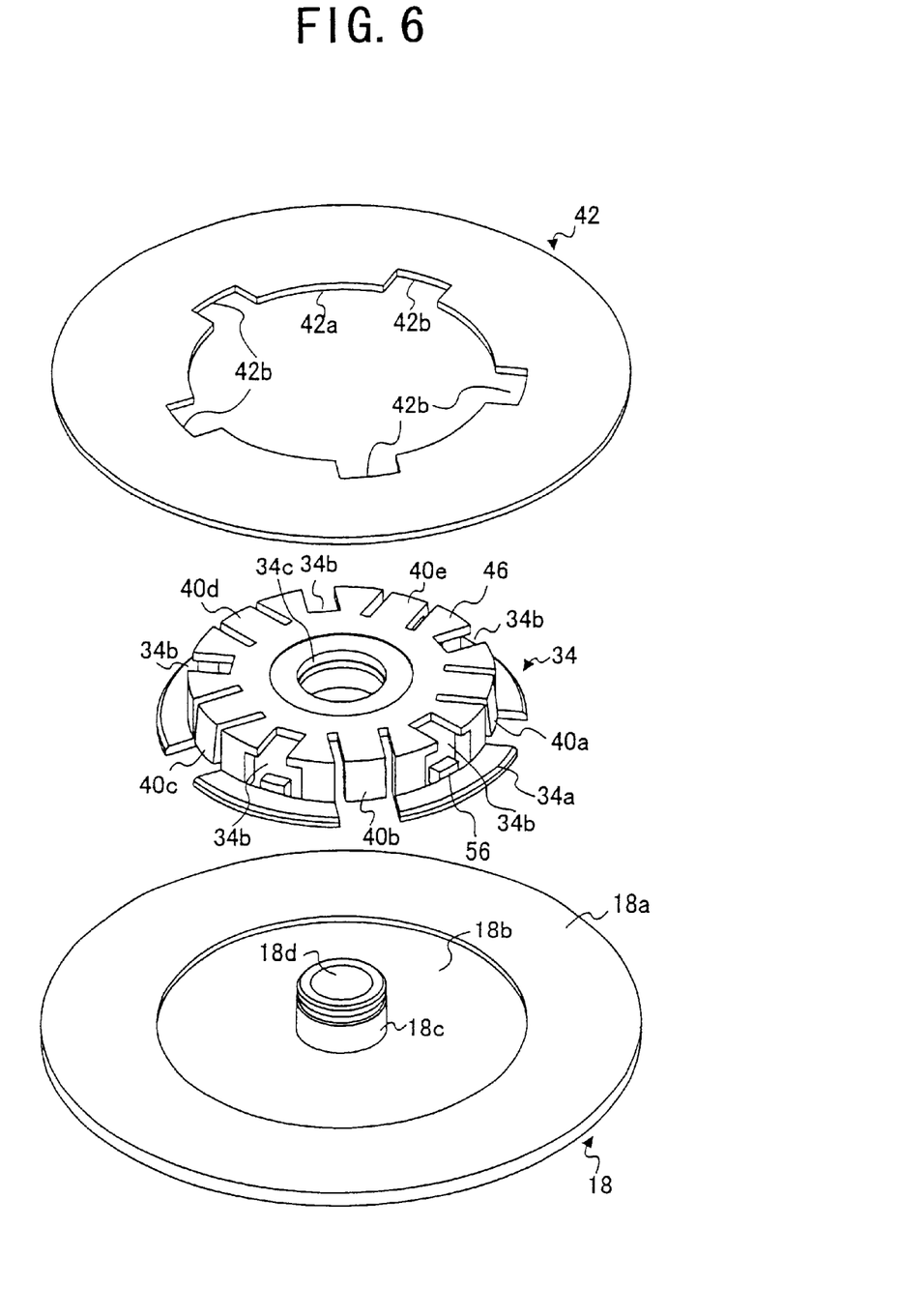
FIG. 6 is an exploded and perspective view showing a disk clamp apparatus 23 according to the present invention.

FIG. 6 is an exploded perspective view showing a disk clamp apparatus 23 according to the present invention. The clamp members 38a though are omitted from description in FIG. 6.

Referring to FIG. 6, the friction member 42 is manufactured by a punching process of a relatively thin rubber material. The inner circumference part 42a of the friction member 42, formed in a state where the friction member 42 faces the innermost circumference of the disk 22, has concave parts 42b for making the clamp members 38a through 38e pass through the friction member 42 at the time of assembling the disk clamp apparatus. The clamp members 38a through 38e project from an outer circumference of the clamper top 34 in a radial direction. The concave parts 42b are provided at five positions corresponding to projecting positions of the clamp members 38a through 38e.

In a case of assembling the disk clamp apparatus, after the coil springs 36 and the clamper members 38a through 38e are provided at the install parts 34b of the clamper top 34, the clamper top 34 is mounted on a clamper top install surface 18b formed inside of the disk mount surface 18a of the clamper table 18. At that time, a center hole 34c of the clamper top 34 is put in position by clamping the center hole 34c of the clamper top 34 to a bearing part 18c having a cylinder shape standing at a center of the clamper table 18. The rotating shaft 44 goes through in a piercing hole 18d of the bearing part 18c.

Next, the friction member 42 is mounted on the disk mounted surface 18a of the clamper table 18 in a state where the concave parts 42b of the friction member 42 are adjusted to the projecting positions of the clamp members 38a through 38e. After that, the friction member 42 is placed on the disk mount surface 18a, in a state where the positions of the concave parts 42b adjust to positions which face to the core adjusting members 40a through 40e, by moving the friction member 42 circumferentially.

Thus, the friction member 42 has a concave part 42b for passing the clamp members 38a through 38e at the inner circumference 42a. Therefore, the friction member 42 is fixed on the disk mount surface 18a in a state where the coil spring 36 and the clamp members 38a through 38e are equipped at the install part 34b of the clamper top 34. As a result of this, it is possible to improve the efficiency of assembling the apparatus.

In addition, the assembling may be implemented to make a structure in which a cut part extending radialtionally is provided at the inner circumference 42a instead of the convex part 42b and the clamp members 38a though 38e pass through the deformed inner circumference 42a.

Figure 7A:
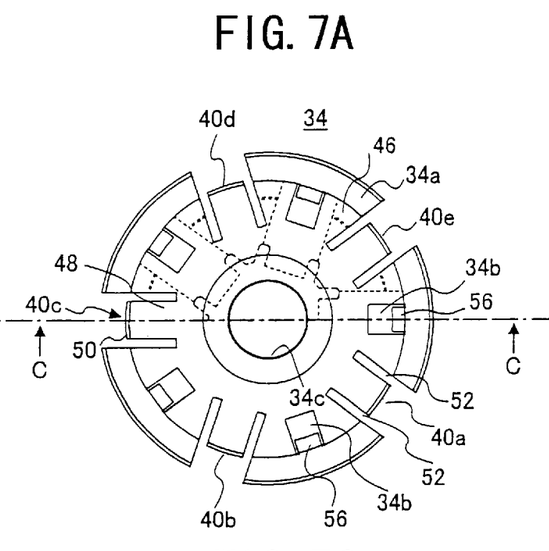
FIG. 7A is a plan view of a structure of a clamper top 34.
Figure 7B:
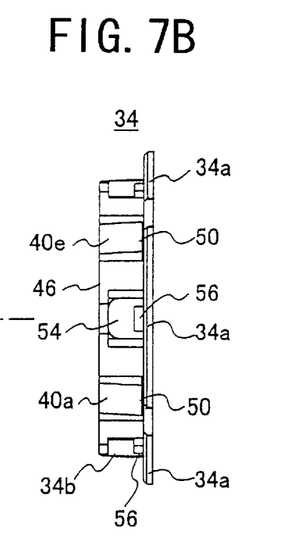
FIG. 7B is an elevational view of a structure of a clamper top 34.
Figure 7C:
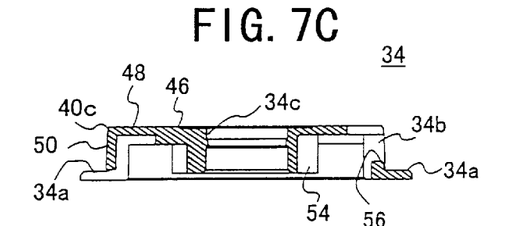
FIG. 7C is a greatly enlarged detailed vertical sectional view of a structure of a clamper top 34.
Figure 7D:
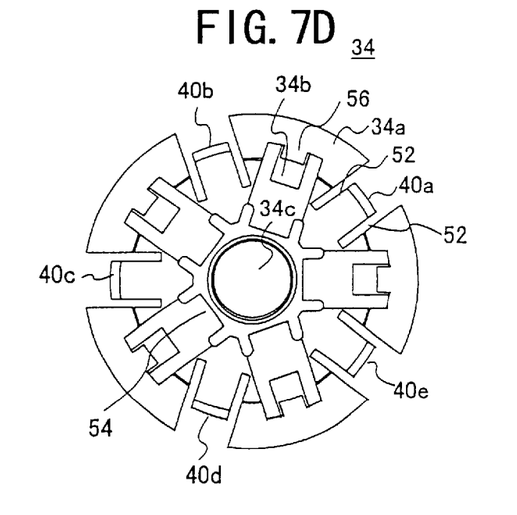
FIG. 7D is a bottom plan view of a structure of a clamper top 34.

FIG. 7A is a plan view of a structure of a clamper top 34. FIG. 7B is an elevational view of a structure of a clamper top 34. FIG. 7C is a greatly enlarged detailed vertical sectional view of a structure of a clamper top 34. FIG. 7D is a bottom plan view of a structure of a clamper top 34.

Referring to FIGS. 7A through 7D, the clamper top 34 includes a guard part 34a, an install part 34b, a center hole 34c, and core adjusting members 40a through 40e. The guard part 34a projects to an outer circumference of a body part 46 clamping an inner circumference of the disk 22. The coil spring 36 and the clamp members 38a through 38e provided inside of the body part 46 are equipped in the install part 34b. A bearing part 18c of the clamper table 18 is inserted into the center hole 34c. The core adjusting members 40a through 40e are provided at an outer circumference of the body part 46. The core adjusting members 40a through 40e are projected from an outer circumference in a radial direction for clamping the inner circumference of the disk 22 and are formed together with the body part 46.

Each of the core adjusting members 40a through 40e have sections having an L shape and include a horizontal part 48 and an inclination part 50. The horizontal part 48 extends in a horizontal direction and the inclination part 50 inclines from an end part of the horizontal part 48 vertically downward. In addition, a slit part 52 is provided at both sides of the core adjusting members 40a through 40e for making the inclination part 50 warp when the center hole part of the disk 22 is clamped by the core adjusting members 40a to 40e.

The install part 34b includes a spring accept part 54 and a hold part 56. An end part of the coil spring 36 is held at the spring accept part 54. The clamp members 38a through 38e are held at the hold part 56.

Figure 8A:
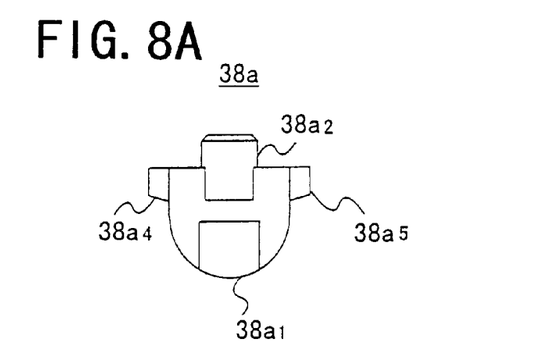
FIG. 8A is a plan view of a structure of clamp members 38a through 38e.
Figures 8B, 8C:
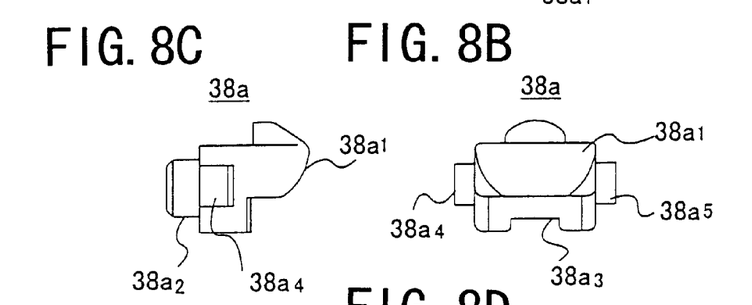
FIG. 8B is a elevational view of a structure of the clamp members 38a through 38e.
FIG. 8C is a side view of a structure of the clamper members 38a through 38e.
Figure 8D:
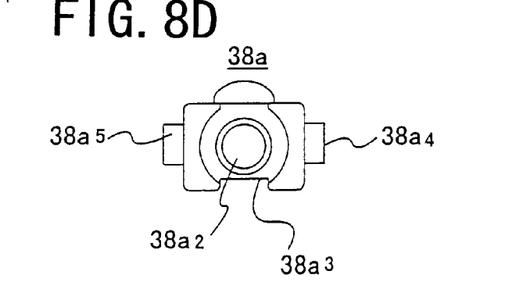
FIG. 8D is a rear elevation of a structure of the clamper members 38a through 38e.

FIG. 8A is a plan view of a structure of clamp members 38a through 38e. FIG. 8B is a front elevational view of a structure of the clamp members 38a through 38e. FIG. 8C is a side view of a structure of the clamp members 38a through 38e. FIG. 8D is a rear elevation of a structure of the clamp members 38a through 38e. Since each of the clamp members 38a though 38e have same structure, the clamp member 38a will be described as a common member.

Referring to FIGS. 8A through 8D, the clamp member 38a includes a head end part $38a_1$, a shaft $38a_2$, a concave part $38a_3$, and stopper parts $38a_4$ and $38a_5$. The head end part $38a_1$ is warped in downward, upward, left, and right directions as the inner circumference end part of the disk 22 is pushed downward. An end part of the coil spring 36 is clamped to the shaft $38a_2$. The hold part 56 is clamped to the concave part $38a_3$. The stopper parts $38a_4$ and $38a_5$ come in contact with an inner wall part of the install part 34b by projecting to both sides.

Thus, the clamp member 38a is equipped with the install part 34b by applying a spring force of the coil spring 36. Therefore, when the disk 22 is clamped at the clamper top 34, the head end part $38a_1$ is pressed and moves inside of the clamper top 34. At that time, a reverse force resulting from the spring force of the coil spring 36 which is pressed and increased is applied to the clamp member 38a. Hence, the disk 22 is clamped by the clamp member 38a in a state where the disk 22 is stuck on the friction member 42 by the reverse force pushing obliquely-downward on an edge of an inner circumference of the disk 22.

Next, a second embodiment of the present invention will be described.

Figure 9A:
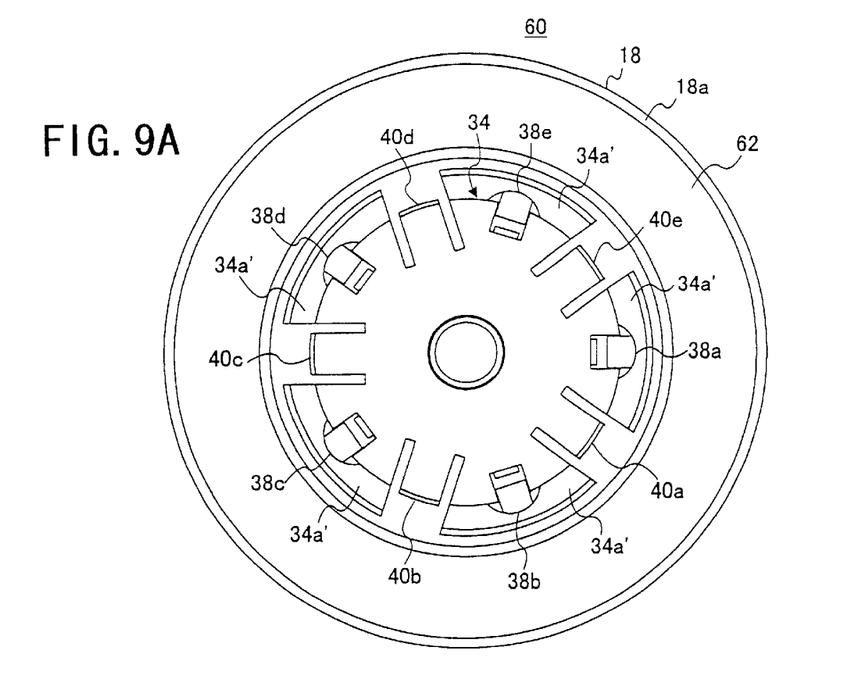
FIG. 9A is a plan view of a disk clamp apparatus of a second embodiment of the present invention.
Figure 9B:
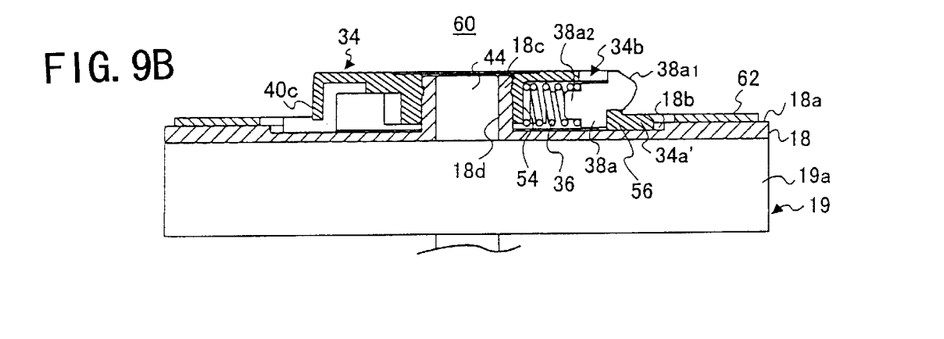
FIG. 9B is a side sectional view of the disk clamp apparatus of the second embodiment of the present invention.
Figure 10:
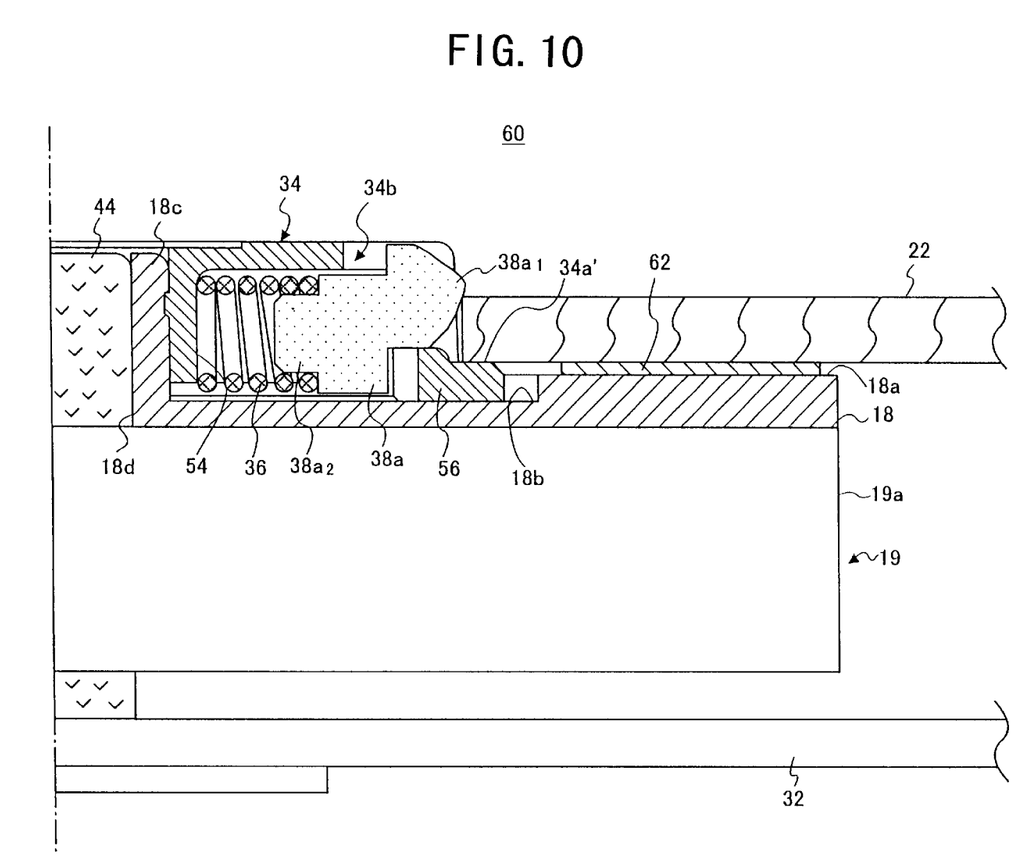
FIG. 10 is a greatly enlarged detailed vertical sectional view of a disk clamp part of a disk clamp apparatus of the second embodiment of the present invention.

FIG. 9A is a plan view of a disk clamp apparatus of a second embodiment of the present invention. FIG. 9B is a side sectional view of the disk clamp apparatus of the second embodiment of the present invention. FIG. 10 is a greatly enlarged detailed vertical sectional view of a disk clamp part of a disk clamp apparatus of the second embodiment of the present invention. In this embodiment, parts that are the same as the parts shown in the first embodiment are given the same reference numerals, and explanation thereof will be omitted.

Referring to FIGS. 9A, 9B and 10, in a disk clamp apparatus of a second embodiment, a friction member 62 fixed on the disk mount surface 18a has an inner diameter having a larger diameter than the inner diameter of the disk 22. A guard part 34a' projecting from an outer circumference of the clamper top 34 in a radial direction is extended to a position which faces to the innermost circumference part of the disk 22. An upper surface of the guard part 34a' is projected and extended to a position having a same height as a height of the upper surface of the friction member 62 fixed on the disk mount surface 18a.

Therefore, a pressing force from the clamp members 38a through 38e clamping the edge part of the inner circumference of the disk 22 can be accommodated by the friction member 62. Hence, it is possible to prevent the edge part of the inner circumference of the disk 22 from being deformed even when the head end parts $38a_1$ through $38e_1$ of the clamp members 38a through 38e press obliquely-downward on the edge part of the inner circumference of the disk 22 due to a spring force of the coil spring 36. Therefore, it is possible to keep a surface accuracy of the disk 22 in a clamped state.

Next, a third embodiment of the present invention will be described.

Figure 11A:
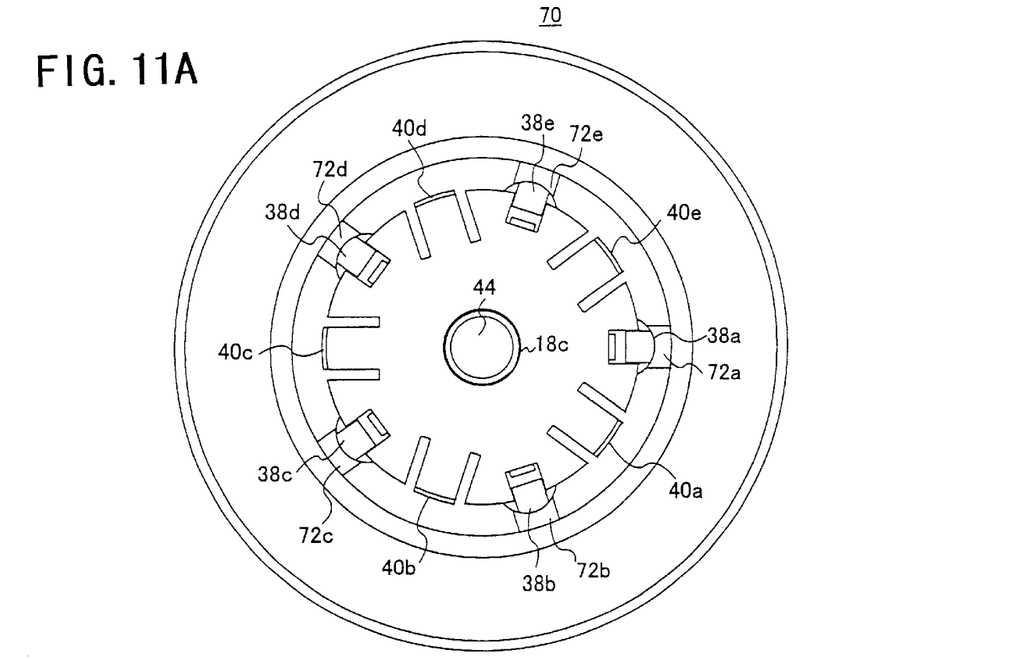
FIG. 11A is a plan view of a disk clamp apparatus of a third embodiment of the present invention.
Figure 11B:
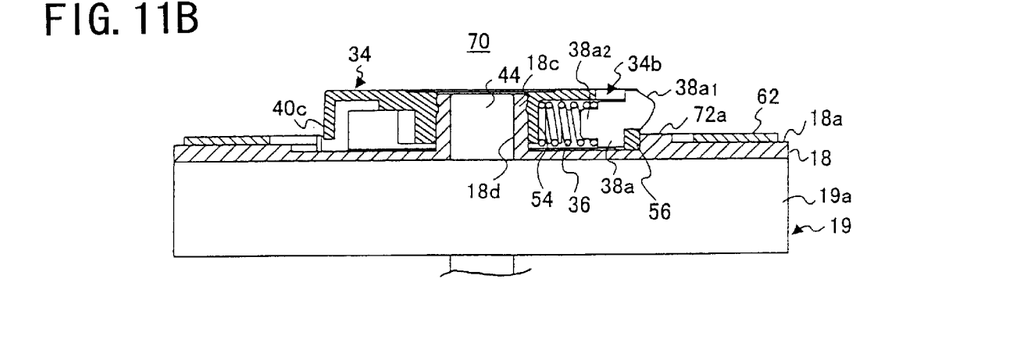
FIG. 11B is a side sectional view of the disk clamp apparatus of the third embodiment of the present invention.
Figure 12:
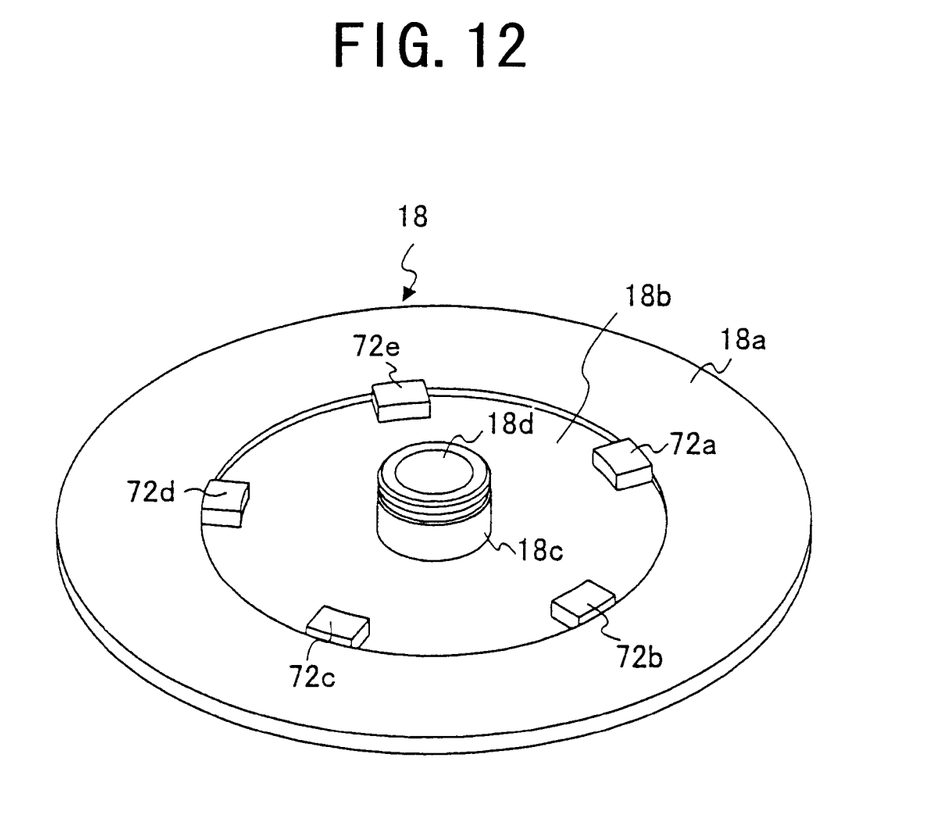
FIG. 12 is an enlarged perspective view of a clamper table 18 of a third embodiment.
Figure 13:
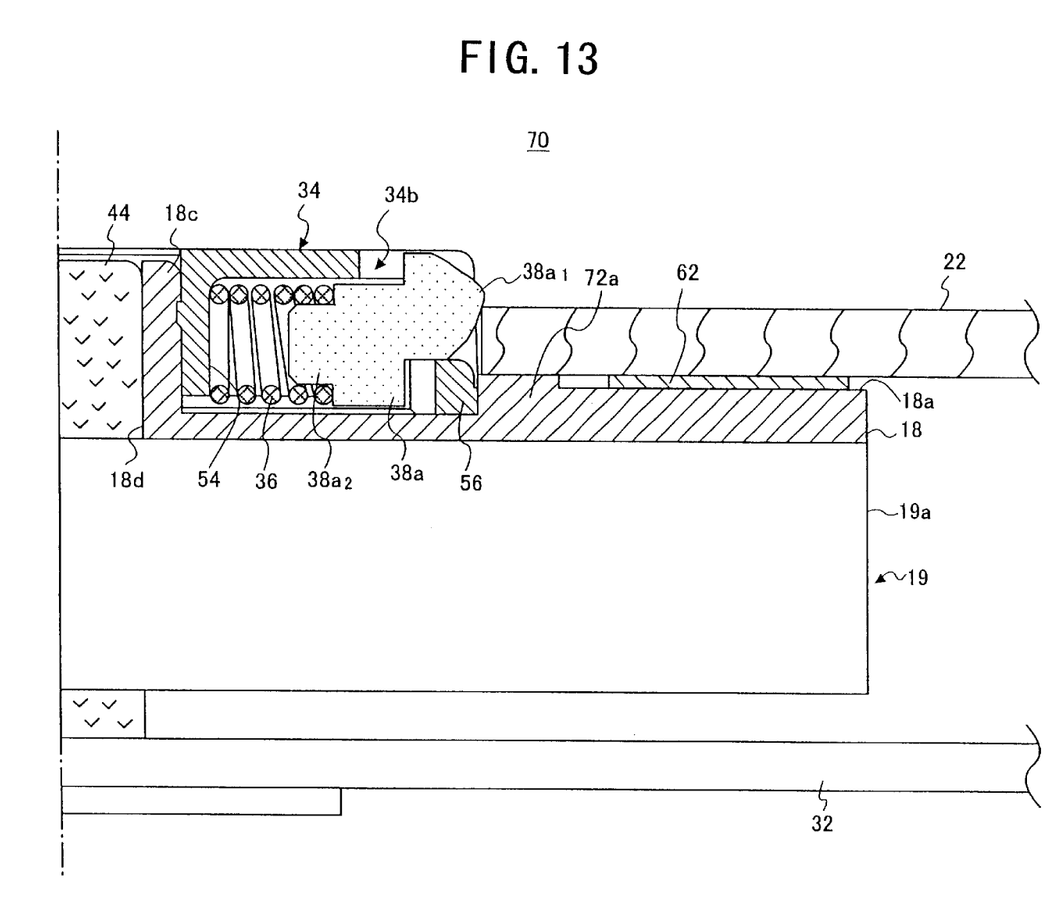
FIG. 13 is an enlarged vertical sectional view of a disk clamp part of the third embodiment.

FIG. 11A is a plan view of a disk clamp apparatus of a third embodiment of the present invention. FIG. 11B is a side sectional view of the disk clamp apparatus of the third embodiment of the present invention. FIG. 12 is an enlarged perspective view of a clamper table 18 of a third embodiment. FIG. 13 is an enlarged vertical sectional view of a disk clamp part of the third embodiment. In this embodiment, parts that are the same as the parts shown in the first and second embodiments are given the same reference numerals, and explanation thereof will be omitted.

Referring to FIGS. 11A, 11B, 12 and 13, according to the disk clamp apparatus of the third embodiment 70, the friction member 42 fixed on the disk mount surface 18a has an inner diameter larger than an inner diameter of the disk 22. The clamper top 34 has a same configuration as the first embodiment. The clamper table 18 mounted and fixed on an upper surface of the disk driving motor 19 has a disk mount surface 18a, a clamper install surface 18b, projection parts 72a through 72e, and a bearing part 18c. The friction member 42 is mounted and fixed on the disk mount surface 18a. The clamper top install surface 18b is formed inside of the disk mount surface 18a of the clamper table 18. The projection parts 72a through 72e project to positions where the inner circumference of the disk mount surface 18a of the clamper top install surface 18b is adjoined. The bearing part 18c has a piercing hole 18d through which the rotating shaft 44 passes.

The projections 72a through 72e provided at the clamper top install surface 18b are arranged at places corresponding to the positions of the install part 34b where the clamp members 38a through 38e are arranged. The projection parts 72a through 72e are provided at positions facing the innermost circumference part of the disk 22. The projections 72a through 72e also project as the upper surfaces of the projections 72a through 72e have a same height as the upper surface of the friction member 62 fixed on the disk mount surface 18a.

Thus, the projection parts 72a through 72e of the clamper table 18 face installed positions of the clamper members 38a through 38e. The projection parts 72a through 72e also project at positions facing the innermost circumference part of the disk 22 in a state where the projection parts 72a through 72e have a same height as the upper surface of the friction member 62. Therefore, the projection parts 72a through 72e can accommodate pushing forces from the clamp members 38a through 38e clamping an inner circumference edge of the disk 22. Thus, even if the head end parts $38a_1$ through $38e_1$ of the clamp members 38a through 38e push obliquely-downward on the edge of the inner circumference of the disk 22 due to a spring force of the coil spring 36, an inner circumference edge of the disk 22 is prevented from being deformed downward. As a result of this, a surface accuracy in a clamped state can be maintained.

In this embodiment, five of the clamp members 38a through 38e and five of the core adjusting members 40a through 40e come in contact with the inner circumference edge of the disk, and thereby the disk 22 mounted on the clamp table 18 is clamped. However, the present invention is not limited to these embodiments, but various variations and modifications may be made without departing from the scope of the present invention. For example, the present invention can be applied to a structure having five or more of the clamp members and the core adjusting members, a structure where the clamp members are arranged with intervals less than 90 degrees, and a structure where the upper surface in an inner circumference of the disk is pressed and clamped.

This patent application is based on Japanese priority patent applications No. 2001-003071 filed on Jan. 10th, 2001 and No. 2001-003072 filed on Jan. 10th, 2001, the entire contents of which are hereby incorporated by reference.

What is claimed is:

1. A disk clamp apparatus, comprising:
   a disk mount surface part on which a record medium having a disk shape is mounted,
   the disk mount surface part comprising:
   a part which faces an innermost circumference surface of the record medium, and
   a part which faces an outer circumference surface situated further out than the innermost circumference surface,
   wherein the part which faces the innermost circumference surface of the record medium has a same height as a height of the part which faces the outer circumference surface situated further out than the innermost circumference surface,
   further comprising a clamp part provided at a center of the disk mount surface for clamping an inner circumference of the record medium, and wherein the clamp part has a projection part projecting from the clamp part to the part which faces the innermost circumference surface of the record medium, and the projection part has a same height as a height of the part which faces the outer circumference surface situated further out than the innermost circumference surface of the record medium.

2. The disk clamp apparatus as claimed in claim 3, further comprising a friction member fixed on the disk mount surface, wherein the friction member forms a continuous surface part in a designated area from the innermost circumference surface to the outer circumference surface situated further out than the innermost circumference surface of the record medium.

3. The disk clamp apparatus as claimed in claim 1, wherein the part which faces the innermost circumference surface of the record medium is united with the part which faces the outer circumference surface situated further out than the innermost circumference surface of the record medium.

4. A disk clamp apparatus, comprising:
   a disk mount surface part on which a record medium having a disk shape is mounted,
   the disk mount surface part comprising:
   a part which faces an innermost circumference surface of the record medium, and
   a part which faces an outer circumference surface situated further out than the innermost circumference surface,
   wherein the part which faces the innermost circumference surface of the record medium has a same height as a height of the part which faces the outer circumference surface situated further out than the innermost circumference surface,
   and further comprising;
   a disk mount surface part on which a record medium having a disk shape is mounted; and
   a clamp part provided at a center of the disk mount surface,
   wherein the clamp part comprises a plurality of clamp members by which a center hole of the record medium is clamed, and the each clamp member has an interval less than 90 degrees.

5. The disk clamp apparatus as claimed in claim 4, wherein five or more of the clamp members are provided at the clamp part.

6. The disk clamp apparatus as claimed in claim 4 wherein the clamp part comprises a plurality of core adjusting members with which an inner circumference of a center hole of the record medium comes in contact, and five or more of the clamp members and five or more of the core adjusting members are provided at the clamp part.

7. A disk clamp apparatus, comprising:

a disk mount surface part on which a record medium having a disk shape is mounted, the disk mount surface part comprising:

a part which faces an innermost circumference surface of the record medium, and a part which faces an outer circumference surface situated further out than the innermost circumference surface, wherein the part which faces the innermost circumference surface of the record medium has a same height as a height of the part which faces the outer circumference surface situated further out than the innermost circumference surface;

and further comprising:

a disk mount surface part on which a record medium having a disk shape is mounted; and a clamp part provided at a center of the disk mount surface, wherein the clamp part comprises a plurality of clamp members having intervals less than 90 degrees respectively by which a center hole of the record medium is clamed and a plurality of core adjusting members with which an inner circumference of the center hole of the record medium comes in contact, and the clamp members, a center of rotation of the record medium, and the core adjusting members are arranged in line.

8. The disk clamp apparatus as claimed in claim 7, wherein five or more of the clamp members are provided at the clamp part.

9. The disk clamp apparatus as claimed in claim 7, wherein the clamp part comprises a plurality of core adjusting members with which an inner circumference of a center hole of the record medium comes in contact, and five or more of the clamp members and five or more of the core adjusting members are provided at the clamp part.

10. A disk clamp apparatus, comprising:

a disk mount surface part on which a record medium having a disk shape is mounted, a clamp part provided at a center of the disk mount surface part, and a friction member fixed on the disk mount surface part, wherein the disk mount surface part includes a part which faces an innermost circumference surface of the record medium, and a part which faces an outer circumference surface situated further out than the innermost circumference surface, wherein the part which faces the innermost circumference surface of the record medium has a same height as a height of the part which faces the outer circumference surface situated further out than the innermost circumference surface, wherein the clamp part includes a plurality of clamp members which projects in a radius direction of the disk mount surface part and is configured to clamp a center hole of the recording medium, wherein a continuous surface part is formed in a designated area of the friction member, situated from a part which faces the innermost circumference surface of the record medium to a part which faces the outer circumference surface situated further out than the innermost circumference surface, wherein the friction member includes a plurality of concave parts whereby the clamp members are passed through for assembling the disk clamp apparatus, and wherein the concave parts are fixed at a position where the concave parts do not face to the clamp members.

* * * * *